(12) United States Patent
Kato

(10) Patent No.: US 9,800,063 B2
(45) Date of Patent: Oct. 24, 2017

(54) POWER TRANSMISSION DEVICE AND WIRELESS POWER TRANSMISSION SYSTEM

(71) Applicant: Murata Manufacturing Co., Ltd., Nagaokakyo-shi, Kyoto-fu (JP)

(72) Inventor: Kazuya Kato, Nagaokakyo (JP)

(73) Assignee: MURATA MANUFACTURING CO., LTD., Nagaokakyo-shi, Kyoto-fu (JP)

(*) Notice: Subject to any disclaimer, the term of this patent is extended or adjusted under 35 U.S.C. 154(b) by 188 days.

(21) Appl. No.: 14/947,351

(22) Filed: Nov. 20, 2015

(65) Prior Publication Data

US 2016/0079772 A1    Mar. 17, 2016

Related U.S. Application Data

(63) Continuation of application No. PCT/JP2014/073445, filed on Sep. 5, 2014.

(30) Foreign Application Priority Data

Sep. 12, 2013  (JP) .................. 2013-189008

(51) Int. Cl.
  *H02J 17/00* (2006.01)
  *H02J 5/00* (2016.01)
  (Continued)

(52) U.S. Cl.
  CPC .............. *H02J 5/005* (2013.01); *H02J 7/025* (2013.01); *H02J 50/05* (2016.02)

(58) Field of Classification Search
  CPC .................. H02J 50/00; H02J 50/05
  See application file for complete search history.

(56) References Cited

U.S. PATENT DOCUMENTS

| 6,844,702 | B2* | 1/2005 | Giannopoulos ......... H02J 7/025 320/108 |
| 7,979,754 | B2* | 7/2011 | Drost ............... G01R 31/31922 29/834 |

(Continued)

FOREIGN PATENT DOCUMENTS

| JP | 2010-183705 A | 8/2010 |
| WO | WO 2012/070479 A1 | 5/2012 |
| WO | WO 2013/077066 A1 | 4/2015 |

OTHER PUBLICATIONS

International Search Report issued for PCT/JP2014/073445, date of mailing Nov. 11, 2014.

(Continued)

*Primary Examiner* — Jeffrey Zweizig
(74) *Attorney, Agent, or Firm* — Arent Fox LLP

(57) ABSTRACT

A power transmission device includes an AC power generator for generating an AC voltage and applying it to first and second power transmission electrodes. A controller controls the AC voltage applied to the first and second power transmission electrodes. To this end, the controller monitors the voltage on the first electrode and determines how that voltage changes at the beginning and end of each of a plurality of predetermined time intervals, monitors the voltage on the second electrode and determines how that voltage changes at the beginning and end of each of the plurality of predetermined time intervals, and determines when to cut off the application of the AC voltage to the first and second power transmission electrodes as a function of the manner in which the voltage on those electrodes changes at the beginning and end of at least one of the predetermined time intervals.

14 Claims, 10 Drawing Sheets

(51) Int. Cl.
*H02J 7/02* (2016.01)
*H02J 50/05* (2016.01)

(56) References Cited

U.S. PATENT DOCUMENTS

2013/0187479 A1 7/2013 Tsuchiya et al.
2014/0253052 A1 9/2014 Goma et al.

OTHER PUBLICATIONS

Written Opinion of the International Searching Authority issued for PCT/JP2014/073445, date of mailing Nov. 11, 2014.

* cited by examiner

POWER TRANSMISSION DEVICE AND WIRELESS POWER TRANSMISSION SYSTEM

CROSS REFERENCE TO RELATED APPLICATIONS

The present application is a continuation of PCT/JP2014/073445, filed Sep. 5, 2014, which claims priority to Japanese Patent Application No. 2013-189008, filed Sep. 12, 2013, the entire contents of each of which are incorporated herein by reference.

TECHNICAL FIELD

The present invention relates to a power transmission device that wirelessly transmits power to a power reception device using an electric field coupling scheme and relates to a wireless power transmission system.

BACKGROUND ART

Among systems in which power is wirelessly transmitted from a power transmission device to a power reception device, there is a system that uses an electric field coupling scheme. In this system, electrodes of the power transmission device and electrodes of the power reception device are electric field coupled with each other and power is transmitted therebetween. In addition, in this electric field coupling scheme, if the amount of power being transmitted is comparatively large and a foreign object is interposed between the electrodes, a malfunction may occur. Accordingly, a wireless power transmission system capable of detecting that a foreign object has come close to an electrode is proposed in International Publication No. 2012/070479.

In the wireless power transmission system described therein, a foreign object detection electrode is provided in the power transmission device so as to be spaced apart from an electrode used for electric field coupling. A voltage generated between the electric field coupling electrode and the foreign object detection electrode is monitored and when this voltage changes by at least a certain amount, it is determined that a foreign object has approached the space between the electric field coupling electrodes of the power transmission device and the power reception device and power transmission is stopped.

However, there is a problem in that a separate foreign object detection electrode needs to be provided and needs to surround an electric field coupling electrode and furthermore the shapes of the electrodes used in the power transmission device are restricted. In addition, if the foreign object detection electrode has a cut-out portion, it will not be possible to detect a foreign object when a foreign object approaches the cut-out portion. Consequently, it may not be possible to detect a foreign object with certainty and there is a risk of malfunction.

Accordingly, an object of the present invention is to provide a power transmission device and a wireless power transmission system capable of preventing a malfunction when a foreign object has become interposed between electrodes with a high degree of certainty.

SUMMARY OF THE INVENTION

A power transmission device of the present invention, which applies an alternating-current voltage to a first power-transmission-side electrode, which opposes a first power-reception-side electrode of a power reception device with a gap therebetween, and to a second power-transmission-side electrode, which opposes a second power-reception-side electrode of the power reception device with a gap therebetween, and transmits power to the power reception device via electric field coupling, includes a first voltage monitoring unit that monitors a voltage of the first power-transmission-side electrode, a first change detection unit that detects a change in each regular interval in the voltage monitored by the first voltage monitoring unit, a second voltage monitoring unit that monitors a voltage of the second power-transmission-side electrode, a second change detection unit that detects a change in each regular interval in the voltage monitored by the second voltage monitoring unit, and a power transmission stopping unit that stops transmission of power to the power reception device on the basis of the changes detected by the first change detection unit and the second change detection unit.

The potentials of the first power-transmission-side electrode and the second power-transmission-side electrode change when a metal foreign object is interposed between an electrode of the power reception device and an electrode of the power transmission device and a person touches the metal foreign object. Consequently, a malfunction caused by a person touching a metal foreign object interposed between the electrodes can be prevented by monitoring the voltages applied to the first power-transmission-side electrode and the second power-transmission-side electrode and stopping the transmission of power on the basis of the changes in the voltages with time.

It is preferable that the power transmission stopping unit stop the transmission of power to the power reception device when one out of the change detected by the first change detection unit and the change detected by the second change detection unit increase over time and the other decreases over time.

When the load on the power reception device side changes, the voltages applied to the first power-transmission-side electrode and the second power-transmission-side electrode increase or decrease over time. Therefore, by determining that a person has touched a metal foreign object interposed between electrodes in the case where one of the voltages applied to the first power-transmission-side electrode and the second power-transmission-side electrode increases and the other decreases over time, a malfunction caused by a foreign object interposed between electrodes can be prevented with more certainty.

It is preferable that the power transmission stopping unit stop transmission of power to the power reception device when an absolute value of a change in a difference between the voltage of the first power-transmission-side electrode and the voltage of the second power-transmission-side electrode exceeds a certain value.

With this configuration, when the change is small, for example, when the load on the power reception device side has changed, it is determined that a person has not touched a metal foreign object interposed between the electrodes and therefore a malfunction caused by a foreign object interposed between the electrodes can be prevented with more certainty.

ADVANTAGEOUS EFFECTS OF INVENTION

According to the present invention, a malfunction caused by a person touching a metal foreign object interposed between electrodes can be prevented.

DESCRIPTION OF EMBODIMENTS

Figure 1:
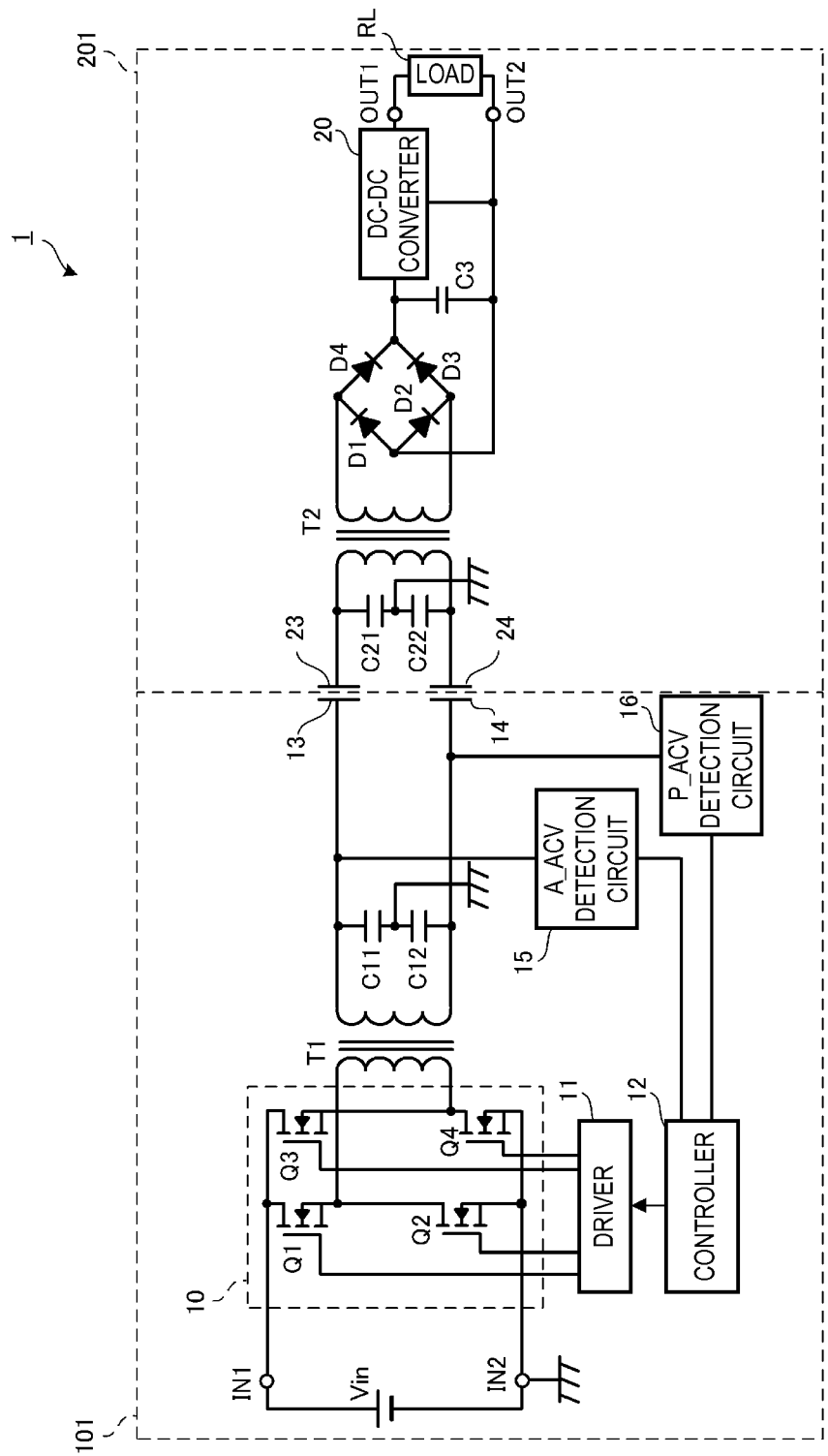
FIG. 1 is a circuit diagram of a wireless power transmission system according to one embodiment of the invention.

FIG. 1 is a circuit diagram of a wireless power transmission system 1 according to a first embodiment of the present invention. The wireless power transmission system 1 according to this embodiment is formed of a power transmission device 101 and a power reception device 201. The power reception device 201 includes a load circuit RL. The load circuit RL may include, for example, a rechargeable battery and a charging circuit. The power reception device 201 may be for example a mobile electronic appliance such as a cellular phone, personal digital assistant (PDA), portable music player, laptop PC, digital camera and so forth. When the power reception device 201 is mounted on the power transmission device 101, the power transmission device 101 charges the rechargeable battery of the power reception device 201.

In FIG. 1, the load circuit RL is provided inside the power reception device 201, but the load circuit RL may for example be provided outside of the power reception device 201 or may be a circuit that can be attached to and detached from the power reception device 201.

A direct-current voltage Vin is connected to input terminals IN1 and IN2 of the power transmission device 101. The direct-current voltage Vin may be generated by an AC adapter connected to a commercial power supply which converts an AC voltage of 100 V to 230 V to a DC voltage of 19 V. However, it is not necessary that the voltage be converted to a DC voltage of 19 V and the voltage may instead be converted to a DC voltage of 5 V or 12 V for example.

A DC-AC inverter circuit 10, which is composed of switch elements Q1, Q2, Q3 and Q4, is connected between the input terminals IN1 and IN2 of the power transmission device 101. The switch elements Q1, Q2, Q3 and Q4 are preferably n-type MOS-FETs. The switch elements Q1 and Q2 are connected in series with each other and the switch elements Q3 and Q4 are connected in series with each other. A primary coil of a step-up transformer T1 is connected to a connection point between the switch elements Q1 and Q2 and a connection point between the switch elements Q3 and Q4. The step-up transformer T1 steps up an alternating-current voltage obtained by conversion of the direct-current voltage Vin.

The switch elements Q1, Q2, Q3 and Q4 are subjected to pulse width modulation (PWM) control by a driver 11. The driver 11 alternately turns the switch elements Q1 and Q4 and the switch elements Q2 and Q3 on and off in accordance with a control signal from a controller 12 (preferably a programmed microprocessor). As a result of the switch elements Q1 and Q4 and the switch elements Q2 and Q3 being alternately turned on and off, the DC-AC inverter circuit 10 converts the direct-current voltage Vin into an alternating-current voltage.

An active electrode 13 and a passive electrode 14 are connected to a secondary coil of the step-up transformer T1. The active electrode 13 is a first power-transmission-side electrode of the present invention and the passive electrode 14 is a second power-transmission-side electrode of the present invention. The active electrode 13 and the passive electrode 14 are preferably shaped like a flat plate and the active electrode 13 has a smaller surface area than the passive electrode 14. The alternating-current voltage stepped up by the step-up transformer T1 is applied to both the active electrode 13 and the passive electrode 14.

A series circuit composed of capacitors C11 and C12 is connected in parallel with the secondary coil of the step-up transformer T1, and the capacitors C11 and C12 form a parallel resonance circuit together with the inductance of the step-up transformer T1. In addition, the capacitors C11 and C12 form a series resonance circuit together with a leakage inductance of the secondary coil of the step-up transformer T1 or together with an inductor that is an actual component.

Figure 2:
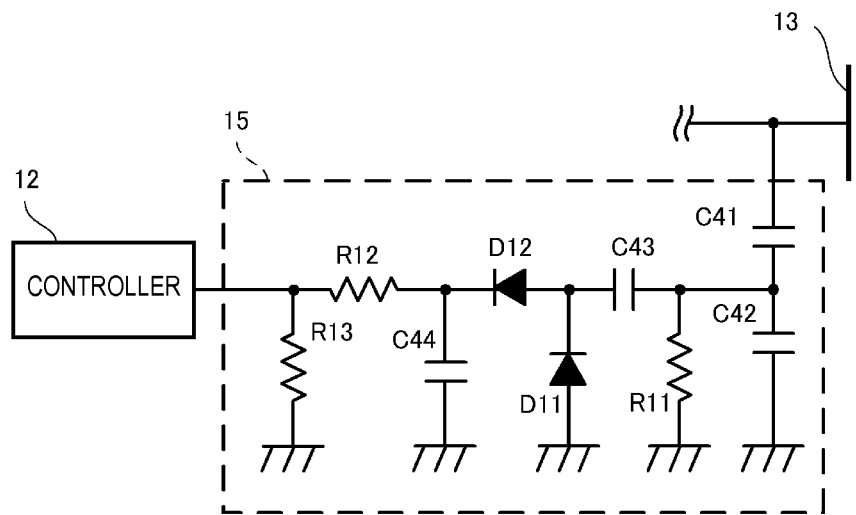
FIG. 2 illustrates a circuit of an A_ACV detection circuit.

An A_ACV detection circuit 15 is connected to the active electrode 13 and detects a voltage A_ACV of the active electrode 13. A P_ACV detection circuit 16 is connected to the passive electrode 14 and detects a voltage P_ACV of the passive electrode 14. The A_ACV detection circuit 15 and the P_ACV detection circuit 16 have the same circuit configuration. The voltage A_ACV of the active electrode 13 and the voltage P_ACV of the passive electrode 14, respectively, have the magnitudes of potential differences between the potential of the active electrode 13 and a reference potential, and the potential of the passive electrode 14 and a reference potential. FIG. 2 illustrates an exemplary circuit of the A_ACV detection circuit 15. The P_ACV detection circuit 16 has the same circuit configuration as the A_ACV detection circuit 15 and therefore description thereof will be omitted.

As shown in FIG. 2, the A_ACV detection circuit 15 includes a voltage divider circuit, composed of capacitors C41 and C42 and is connected to a the active electrode 13. A resistor R11 is connected to a connection point between the capacitors C41 and C42 and is grounded at one end. The resistor R11 removes a low-frequency component. Rectification diodes D11 and D12 and a capacitor C44 are connected to the connection point between the capacitors C41 and C42 via a DC cut capacitor C43. Voltage control resistors R12 and R13 are connected to each other and to the controller 12.

The controller 12 controls the driver 11 to cause the switch elements Q1 and Q4 and the switch elements Q2 and Q3 to be alternately turned on and off in a manner that will attempt to maintain the voltage A_ACV at a certain voltage.

In addition, the controller 12 monitors changes in the voltages A_ACV and P_ACV (via the output of A_ACV detection circuit 15 and the P_ACV detection circuit 16) over time by detecting those voltages at regular time intervals and determines whether to stop power transmission to prevent a user from receiving an electric shock when a metal foreign object has become interposed between the passive electrode 14 and an opposing passive electrode 24 of the power reception device 201 or the active electrode 13 and an opposing active electrode 23 and the user touches the metal foreign object.

The power reception device 201 includes an active electrode 23 and a passive electrode 24. The active electrode 23 is a first power-reception-side electrode of the present invention and the passive electrode 24 is a second power-reception-side electrode of the present invention. The active electrode 23 and the passive electrode 24 have substantially the same surface areas as the active electrode 13 and the passive electrode 14, respectively, and face the active electrode 13 and the passive electrode 14 of the power transmission device 101, respectively, with gaps therebetween when the power reception device 201 is mounted on the power transmission device 101 in an operative position. An alternating-current voltage is applied between the active electrode 13 and the passive electrode 14 and as a result an electric field is generated between the active electrodes 13 and 23 and between the passive electrodes 14 and 24 when they are arranged to face one another. Power is transmitted from the power transmission device 101 to the power reception device 201 via these electric fields.

A primary coil of a step-down transformer T2 is connected to the active electrode 23 and the passive electrode 24 of the power reception device 201. A series circuit composed of capacitors C21 and C22 is connected in parallel with the primary coil. The capacitors C21 and C22 form a parallel resonance circuit together with the inductance of the step-down transformer T2. The resonant frequency of the parallel resonance circuit is set to substantially the same resonant frequency as the series resonance circuit of the power transmission device 101 in order to realize efficient transmission of power.

A diode bridge, which is composed of diodes D1, D2, D3 and D4, is connected to the secondary coil of the step-down transformer T2. One output of the diode bridge is connected to an output terminal OUT1 via a smoothing capacitor C3 and a DC-DC converter 20. The other output of the diode bridge is connected to an output terminal OUT2. The load circuit RL, which includes the rechargeable battery, the charging circuit and another load circuit, is connected to the output terminals OUT1 and OUT2. The diode bridge and the smoothing capacitor C3 define a rectification-smoothing circuit and rectify and smooth an alternating-current voltage stepped down by the step-down transformer T2. The rectified and smoothed direct-current voltage is converted into a stabilized predetermined voltage by the DC-DC converter 20.

In the thus-structured wireless power transmission system 1, the controller 12 determines whether power transmission should be stopped as a function of the detected voltages A_ACV and P_ACV on the basis of changes over time in the voltages A_ACV and P_ACV. As a result, the user can be prevented from experiencing an electric shock even if the user touches a metal foreign object interposed between the passive electrodes 14 and 24 and/or the active electrodes 13 and 23.

Figure 3:
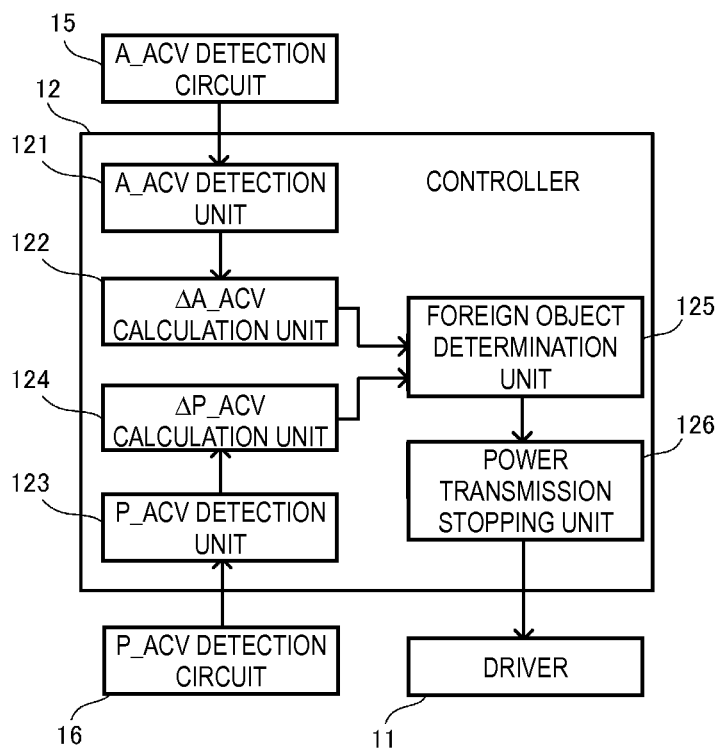
FIG. 3 is a block diagram illustrating the configuration of a controller.

FIG. 3 is a block diagram illustrating the configuration of the controller 12. The controller 12 is preferably a programmed microprocessor. The program causes the microprocessor to function as an A_ACV detection unit 121, a $\Delta$A_ACV calculation unit 122, a P_ACV detection unit 123, a $\Delta$P_ACV calculation unit 124, a foreign object determination unit 125 and a power transmission stopping unit 126.

The A_ACV detection unit 121 detects the voltage A_ACV at regular time intervals ($\Delta$t) using the output of the A_ACV detection circuit 15 which acts as a first voltage monitoring unit.

The $\Delta$A_ACV calculation unit 122 calculates a difference in the voltage A_ACV over time. More particularly, the $\Delta$A_ACV calculation unit 122 calculates a difference $\Delta$A_ACV between a voltage A_ACV detected by the A_ACV detection unit 121 at an instant t and a voltage A_ACV detected by the A_ACV detection unit 121 at a later instant t+$\Delta$t ($\Delta$t being the predetermined time interval). The $\Delta$A_ACV calculation unit 122 functions as a first change detection unit.

The P_ACV detection unit 123 detects the voltage P_ACV at regular intervals ($\Delta$t) using the output of the P_ACV detection circuit 16. The P_ACV detection unit 123 acts as a second voltage monitoring unit.

The $\Delta$P_ACV calculation unit 124 calculates a difference in the voltage P_ACV over time. More particularly, the $\Delta$P_ACV calculation unit 124 calculates a difference $\Delta$P_ACV between a voltage P_ACV detected by the P_ACV detection unit 123 at an instant t and a voltage P_ACV detected by the P_ACV detection unit 123 at a later instant t+$\Delta$t. The $\Delta$P_ACV calculation unit 124 acts as a second change detection unit.

The foreign object determination unit 125 determines whether a metal foreign object is interposed between the passive electrodes 14 and 24 and that a user has touched the metal foreign object on the basis of the differences $\Delta$A_ACV and $\Delta$P_ACV more particularly, the foreign object determination unit 125 multiplies the differences $\Delta$A_ACV and $\Delta$P_ACV together and determines whether or not the result of the multiplication has a negative value. When a metal foreign object is not interposed between the passive electrodes 14 and 24, the voltage applied to the active electrode 13 and the passive electrode 14 is displaced depending on the state on the power reception device 201 side (for example, when the power reception device 201 is fully charged or when a constant of the resonance circuit has been displaced). In such a case, the voltages applied to the active electrode 13 and the passive electrode 14 can increase or decrease. Consequently, in the case where the result of multiplying the difference $\Delta$A_ACV and the difference $\Delta$P_ACV has a negative value, that is, in the case where one of the voltages applied to the active electrode 13 and the passive electrode 14 increases and the other decreases, the foreign object determination unit 125 determines that a metal foreign object is interposed between the passive electrodes 14 and 24 and that a user has touched the metal foreign object.

In addition, the foreign object determination unit 125 determines whether or not an absolute value |$\Delta$ACV| of the difference between the differences $\Delta$A_ACV and $\Delta$P_ACV is equal to or greater than a certain value. In the case where the absolute value |$\Delta$ACV| is equal to or greater than the certain value, it is determined that a metal foreign object is interposed between the passive electrodes 14 and 24 and that a user has touched the metal foreign object.

In the case where it has been determined by the foreign object determination unit 125 that a user has touched a metal foreign object interposed between the passive electrodes 14 and 24, the power transmission stopping unit 126 controls the driver 11 in order to stop driving the DC-AC inverter circuit 10 with the result that transmission of power to the power reception device 201 will cease. For example, the transmission of power may be stopped by turning the switch elements Q1 to Q4 off, or a switch element may be provided along a power supply line connected to the input terminal IN1 and the supply of power to the DC-AC inverter circuit 10 from the direct-current voltage Vin may be interrupted by turning this switch element off.

Thus, the controller 12 monitors the voltages A_ACV and P_ACV and determines whether to stop the transmission of power on the basis of changes in these voltages over time. Hereafter, the reason why the voltage A_ACV and the voltage P_ACV are shifted by the controller 12 when a metal foreign object interposed between the passive electrodes 14 and 24 and is touched by a user will be explained.

Figure 4A:
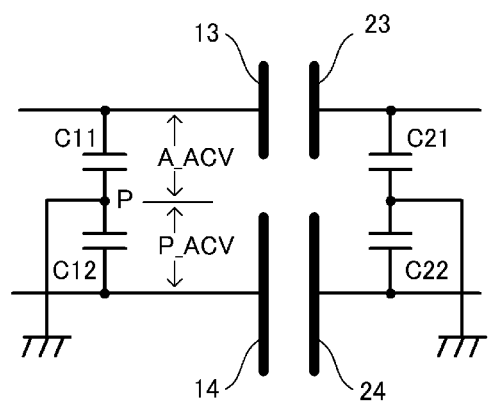
FIGS. 4A and 4B are diagrams for explaining an equivalent circuit for a case when a user touches a metal foreign object interposed between passive electrodes.
Figure 4B:
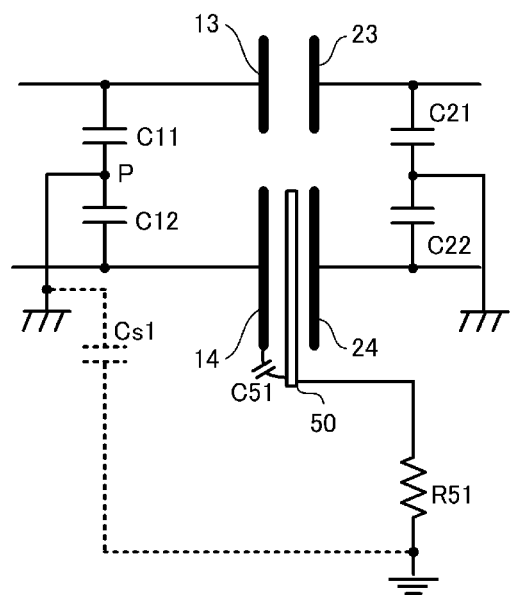

FIGS. 4A and 4B are diagrams for explaining an equivalent circuit for a case when a user has touched a metal foreign object interposed between the passive electrodes 14 and 24.

FIG. 4A illustrates a circuit of part of the wireless power transmission system 1 at a normal time (i.e., when there is no foreign object located between the passive or active electrodes and the user has not touched such object). A connection point P between the capacitors C11 and C12 is at a reference potential and the capacitors C11 and C12 form a voltage divider circuit connected between the active electrode 13 and the passive electrode 14. In this embodiment, the passive electrodes 14 and 24 have larger surface areas and larger capacitances than the active electrodes 13 and 23. In order to make the potential of the connection point P between the capacitors C11 and C12, which is the reference potential of the power transmission device 101, and the potential of the connection point between the capacitors C21 and C22, which is the reference potential of the power reception device 201, equal to each other and stable, the capacitance ratio between the capacitors C11 and C12 and the capacitance ratio between the capacitors C21 and C22 are made to be the same as the capacitance ratio between a capacitance formed by the active electrodes 13 and 23 and the capacitance formed by the passive electrodes 14 and 24, respectively. A charging voltage of the capacitor C11 corresponds to the voltage A_ACV and a charging voltage of the capacitor C12 corresponds to the voltage P_ACV.

FIG. 4B illustrates a circuit for the case where a metal foreign object (for example, a paper clip) 50 has become interposed between the passive electrodes 14 and 24 and a user has touched the metal foreign object 50. Due to the metal foreign object 50 being interposed between the passive electrodes 14 and 24, a capacitance C51 is generated between the passive electrode 14 and the metal foreign object 50. In addition, the metal foreign object 50 is grounded to the earth via a resistance component R51 generated by the human body (user) touching the metal foreign object 50.

Furthermore, this circuit can be treated as a circuit in which the connection point P connected to the reference potential of the power transmission device 101 is grounded to the earth via a stray capacitance Cs1. In this case, when a user touches the metal foreign object 50, the connection point P, that is, the reference potential, is shifted to the potential of the earth. Therefore, the division ratio between the active electrode 13 and the passive electrode 14 is changed and a change in the reference potential is generated due to the capacitance C51, the resistance R51 and the stray capacitance Cs1, and the effect of this appears in the detection results when the voltages A_ACV and P_ACV are detected.

Figure 5:
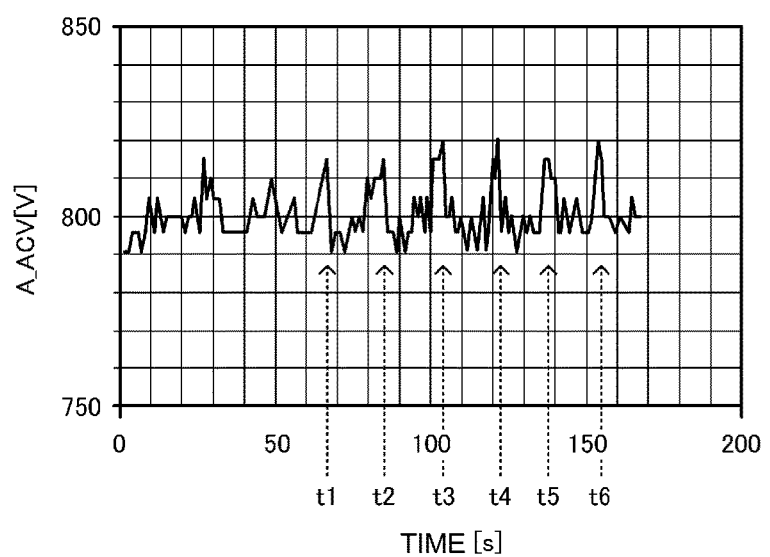
FIG. 5 illustrates detection results for a voltage A_ACV sampled at discrete times.
Figure 6:
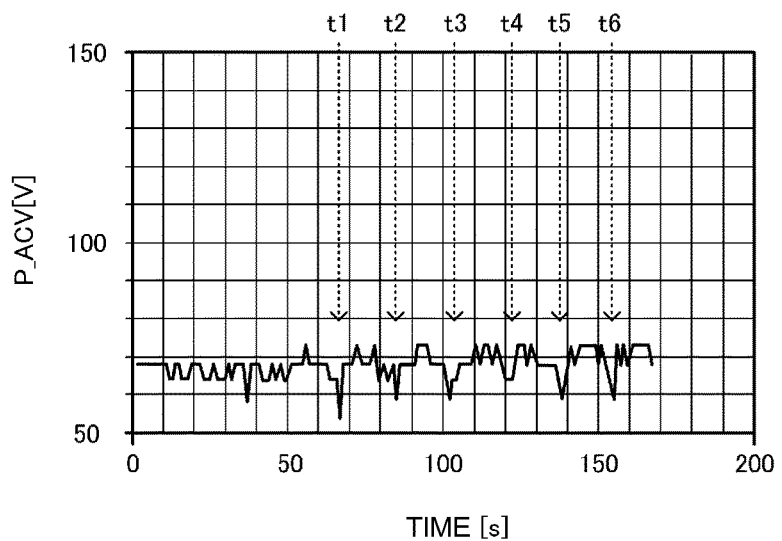
FIG. 6 illustrates detection results for a voltage P_ACV sampled at discrete times.

FIG. 5 illustrates detection results for the voltage A_ACV sampled at discrete times. FIG. 6 illustrates detection results for the voltage P_ACV sampled at discrete times. Timings t1, t2, t3, t4, t5 and t6 illustrated in FIGS. 5 and 6 are timings at which the metal foreign object 50 interposed between the passive electrodes 14 and 24 is touched by a user. The voltage A_ACV and the voltage P_ACV change at these timing instants.

As illustrated in FIG. 5, the voltage A_ACV increases at the timings t1 to t6 when a user touches the metal foreign object 50. Consequently, the differences ΔA_ACV between the voltages A_ACV detected at the timings t1 to t6 and the voltages A_ACV detected Δt after the timings t1 to t6 have positive values. In addition, as illustrated in FIG. 6, the voltage P_ACV decreases at the timings t1 to t6. Consequently, the differences ΔP_ACV between the voltages P_ACV detected at the timings t1 to t6 and the voltages P_ACV detected Δt after the timings t1 to t6 have negative values. Therefore, when a user touches the metal foreign object 50 interposed between the passive electrodes 14 and 24, the result of multiplication of ΔA_ACV and ΔP_ACV has a negative value. Consequently, as described above, the foreign object determination unit 125 is able to determine whether a metal foreign object 50 is interposed between the passive electrodes 14 and 24 and has been touched by a user from the result of multiplication of the difference ΔA_ACV and the difference ΔP_ACV.

Figure 7:
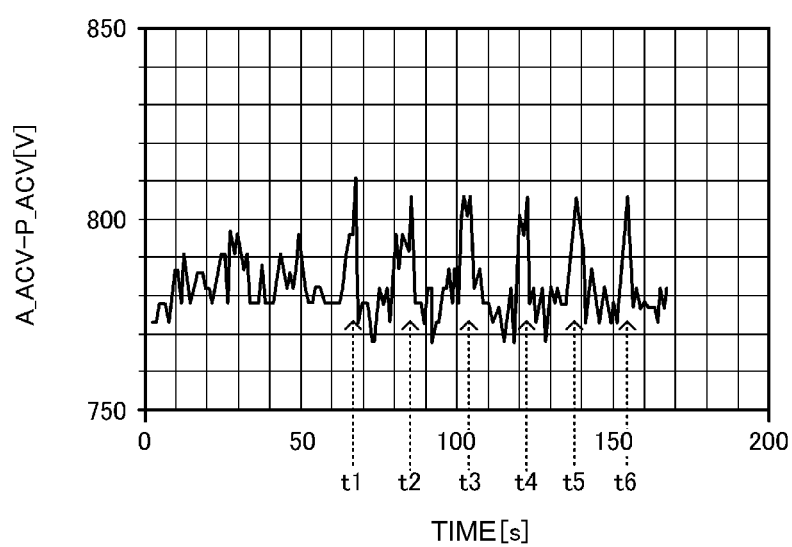
FIG. 7 illustrates results for a voltage difference between the voltage A_ACV and the voltage P_ACV sampled at discrete times.

FIG. 7 illustrates results for a voltage difference between the voltage A_ACV and the voltage P_ACV sampled at discrete times. As illustrated in FIG. 7, a difference voltage Δ(A_ACV−P_ACV), which is the difference between the voltage A_ACV and the voltage P_ACV, increases at the timings t1 to t6 when the user touches the metal foreign object 50. Consequently, the foreign object determination unit 125 is able to determine whether a user has touched the metal foreign object 50 interposed between the passive electrodes 14 and 24 on the basis of whether the voltage increases by at least a certain predetermined amount. When the voltage increases by at least a predetermined amount, the foreign object determination unit 125 stops transmission of power at the timings t1 to t6. Although it is assumed in this embodiment that a metal foreign object is interposed between the passive electrodes 14 and 24, the present invention is not limited to this case. A case in which a metal foreign object becomes interposed between the active electrodes 13 and 23 and touched can be similarly detected.

Figure 8A:
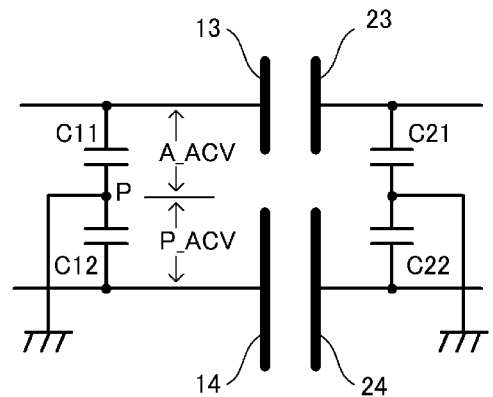
FIGS. 8A and AB are diagrams for explaining an equivalent circuit for a case when a user touches a metal foreign object interposed between active electrodes.
Figure 8B:
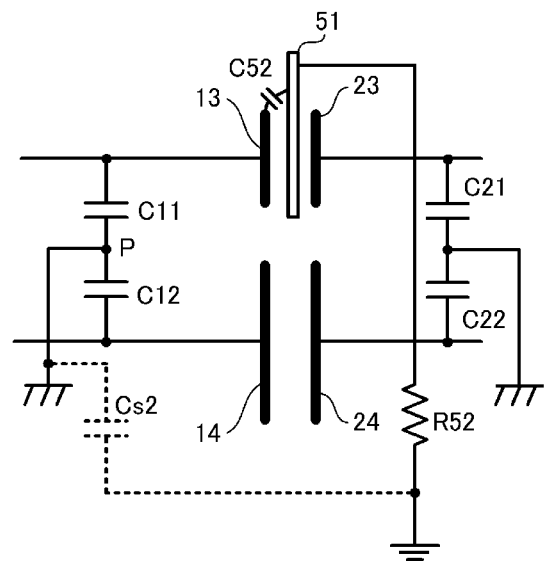

FIGS. 8A and 8B are diagrams for explaining an equivalent circuit for a case when a user touches a metal foreign object interposed between the active electrodes 13 and 23.

FIG. 8A, similarly to FIG. 4A, illustrates a circuit of part of the wireless power transmission system 1 at a normal time (when there is no foreign object interposed between electrodes 13 and 23 or 14 and 24). FIG. 8B illustrates a circuit when a metal foreign object (for example, a paper clip) 51 has become interposed between the active electrodes 13 and 23 and a user has touched the metal foreign object 51. Due to the presence of the metal foreign object 51 interposed between the active electrodes 13 and 23, a capacitance C52 is generated between the active electrode 13 and the metal foreign object 51. In addition, the metal foreign object 51 is grounded to the earth via a resistance component R52 generated by the human body (user) touching the metal foreign object 51.

Furthermore, this circuit can be treated as a circuit in which the connection point P connected to the reference potential of the power transmission device 101 is grounded to the earth via a stray capacitance Cs2. In this case, when a user touches the metal foreign object 51, the connection point P, that is, the reference potential, is shifted to the potential of the earth. Therefore, a change in the division ratio between the active electrode 13 and the passive electrode 14 and a shift in the reference potential are generated due to the presence of capacitance C52, the resistance R52 and the stray capacitance Cs2, and consequently the effect of the shift in the reference potential appears when the voltage A_ACV and the voltage P_ACV are detected.

Figure 9:
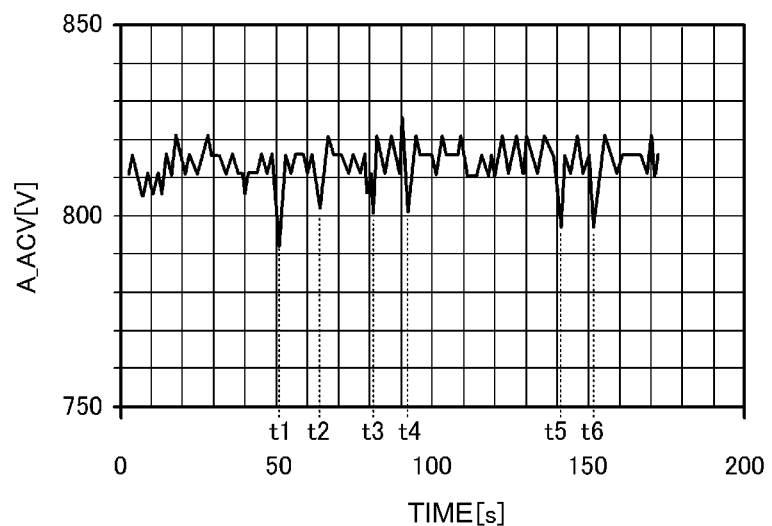
FIG. 9 illustrates detection results for a voltage A_ACV sampled at discrete times.
Figure 10:
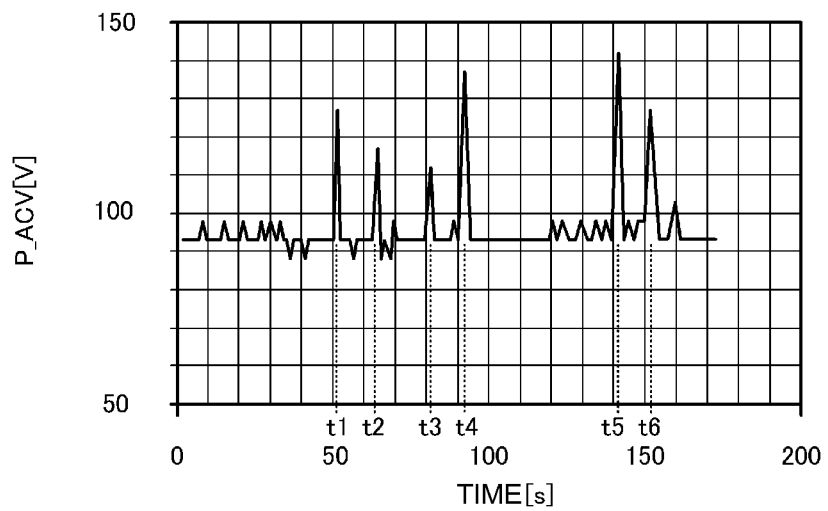
FIG. 10 illustrates detection results for a voltage P_ACV sampled at discrete times.

FIG. 9 illustrates detection results for the voltage A_ACV sampled at discrete time instants. FIG. 10 illustrates detection results for the voltage P_ACV sampled at discrete time instants. Timings t1, t2, t3, t4, t5 and t6 illustrated in FIGS. 9 and 10 are timing instants at which the metal foreign object 51 interposed between the electrodes is touched by a user. As shown, the voltage A_ACV and the voltage P_ACV change at these timing instants.

As illustrated in FIGS. 9 and 10, one of the voltages A_ACV and P_ACV increases and the other decreases when a metal foreign object has become interposed between the active electrodes 13 and 23 and a user has touched the metal foreign object. In other words, as illustrated in FIG. 9, the differences $\Delta A\_ACV$ between the voltages A_ACV detected at the timings t1 to t6 and the voltages A_ACV detected $\Delta t$ after the timings t1 to t6 have negative values. Conversely, as illustrated in FIG. 10, the differences $\Delta P\_ACV$ between the voltages P_ACV detected at the timings t1 to t6 and the voltages P_ACV detected $\Delta t$ after the timings t1 to t6 have positive values. Therefore, like the above-described case where a metal foreign object has become interposed between passive electrodes 14 and 24 and a user has touched the metal foreign object, it can be detected that a metal foreign object has become interposed between the active electrodes 13 and 23 and a user has touched the metal foreign object when a result of multiplication of the difference $\Delta A\_ACV$ and the difference $\Delta P\_ACV$ has a negative value and the absolute value $|\Delta ACV|$ of the difference between the difference $\Delta A\_ACV$ and the difference $\Delta P\_ACV$ is equal to or greater than a certain value.

Although it is difficult to accurately differentiate between whether a metal foreign object has become interposed between the active electrodes 13 and 23 or whether a metal foreign object has become interposed between the passive electrodes 14 and 24 and a user has then touched the metal foreign object by just looking at the change in the absolute value $|\Delta ACV|$ of the difference between the difference $\Delta A\_ACV$ and the difference $\Delta P\_ACV$, it is possible to differentiate between these cases by looking at the sign of $\Delta ACV$. When the difference between the difference $\Delta A\_ACV$ and the difference $\Delta P\_ACV$ is defined as $\Delta ACV = \Delta A\_ACV - \Delta P\_ACV$, as it clear from FIG. 7, it can be differentiated that a metal foreign object has become interposed between the passive electrodes 14 and 24 and a user has touching the interposed metal foreign object when $\Delta ACV$ has a positive value, and from FIGS. 9 and 10, it can be determined that a metal foreign object has become interposed between the active electrodes 13 and 23 and a user has touched the interposed metal foreign object when $\Delta ACV$ has a negative value.

In the described embodiment the passive electrodes 14 and 24 have a larger surface area than the active electrodes 13 and 23. However the active electrodes 13 and 23 and the passive electrodes 14 and 24 may have substantially the same surface areas. Hereafter, a system in which the surface area of the passive electrode 14 is larger than the surface area of the active electrode 13, as in the described embodiment, will be referred to as a non-symmetrical system and a system in which the surface areas of the active electrode 13 and the passive electrode 14 are the same as each other will be referred to as a symmetrical system.

There is no difference between the surface areas active electrodes and the passive electrodes in the case of a symmetrical system. When one of the two electrodes of the power transmission device 101 respectively face the two electrodes of the power reception device 201, one serves as an active electrode and the other serves as a passive electrode.

Figure 11:
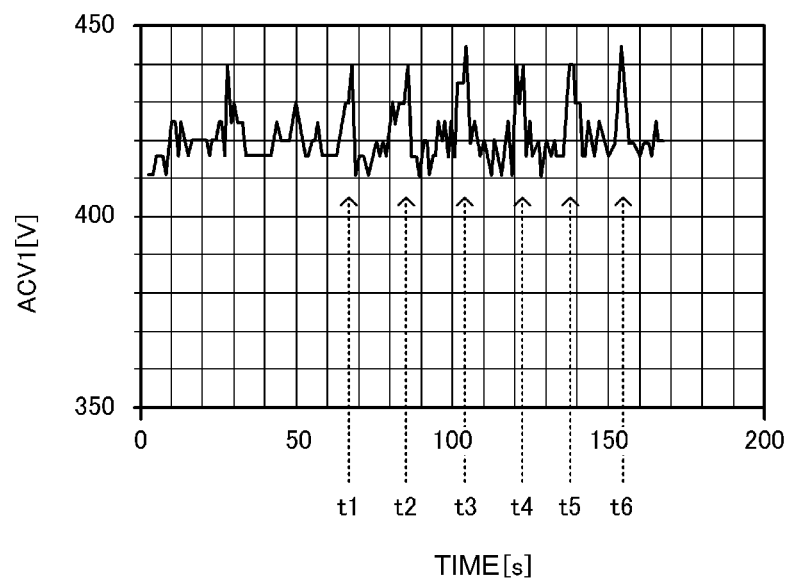
FIG. 11 illustrates detection results for a voltage ACV1 sampled at discrete times.
Figure 12:
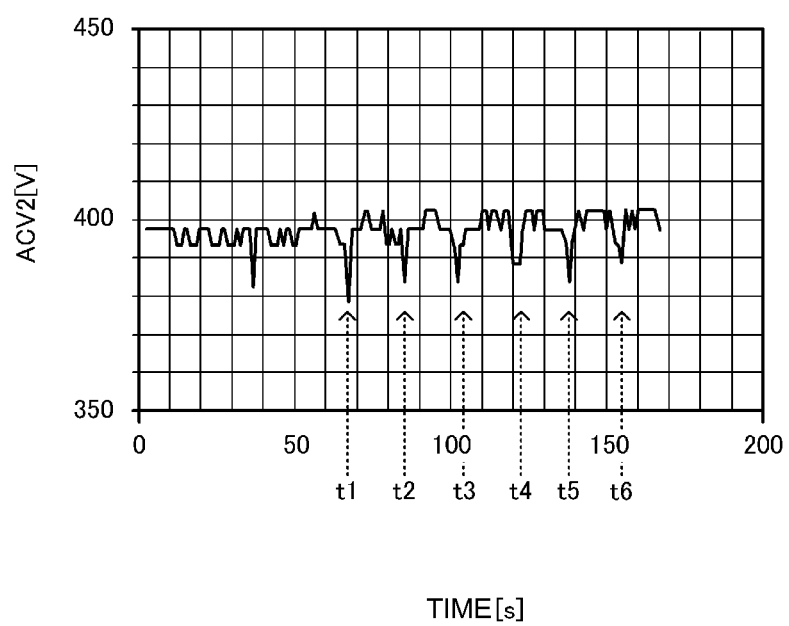
FIG. 12 illustrates detection results for a voltage ACV2 sampled at discrete times.

Hereafter, waveforms of the voltage ACV1 applied to the first electrode and the voltage ACV2 applied to the second electrode in a case where a metal foreign object has become interposed between the second electrode and the electrode of the power reception device 201 facing the second electrode and a user has touched the metal foreign object will be illustrated. FIG. 11 illustrates detection results for the voltage ACV1 sampled at discrete times. FIG. 12 illustrates detection results for the voltage ACV2 sampled at discrete times. Timings t1, t2, t3, t4, t5 and t6 illustrated in FIGS. 11 and 12 are timings at which the metal foreign object interposed between the electrodes is touched by a user. The voltage ACV1 and the voltage ACV2 change at these timings.

As illustrated in FIG. 11, the voltage ACV1 increases at the timings t1 to t6 when a user touches the metal foreign object. In addition, as illustrated in FIG. 12, the voltage ACV2 decreases at the timings t1 to t6. That is, the voltage ACV1 applied to the first electrode where the metal foreign object is not interposed increases and the voltage ACV2 applied to the second electrode where the metal foreign object is interposed decreases. Therefore, like the case of a non-symmetrical system, it is possible to determine whether a user is touching a metal foreign object interposed between the electrodes by multiplying an amount of change in the voltage ACV1 and an amount of change in the voltage ACV2 in a time interval ($\Delta t$).

Figure 13:
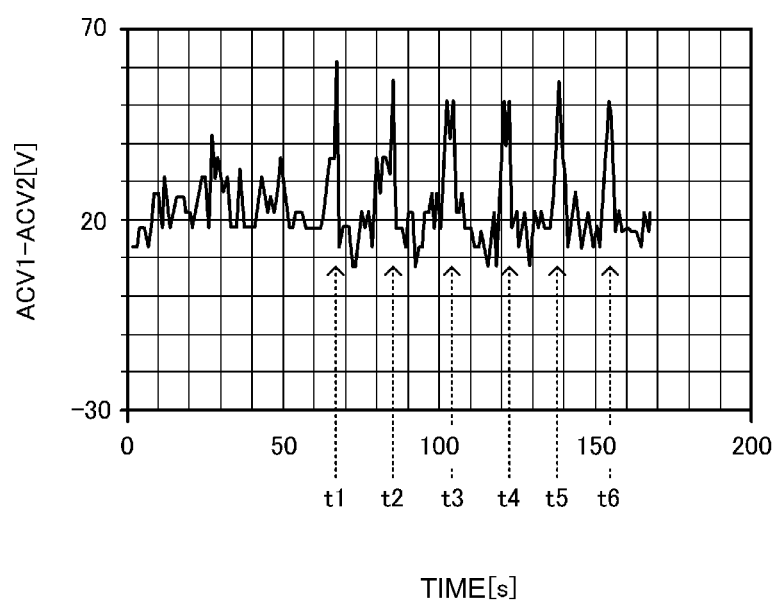
FIG. 13 illustrates results for a voltage difference between the voltage ACV1 and the voltage ACV2 sampled at discrete times.

FIG. 13 illustrates results for a voltage difference between the voltage ACV1 and the voltage ACV2 sampled at discrete times. As illustrated in FIG. 13, a differential voltage $\Delta(ACV1-ACV2)$, which is the difference between the voltage ACV1 and the voltage ACV2, increases at the timings t1 to t6 when the user touches the metal foreign object. Consequently, it is possible to determine that a user has touched the metal foreign object interposed between the electrodes when the voltage increases by at least a predetermined amount at the timings t1 to t6.

Figure 14:
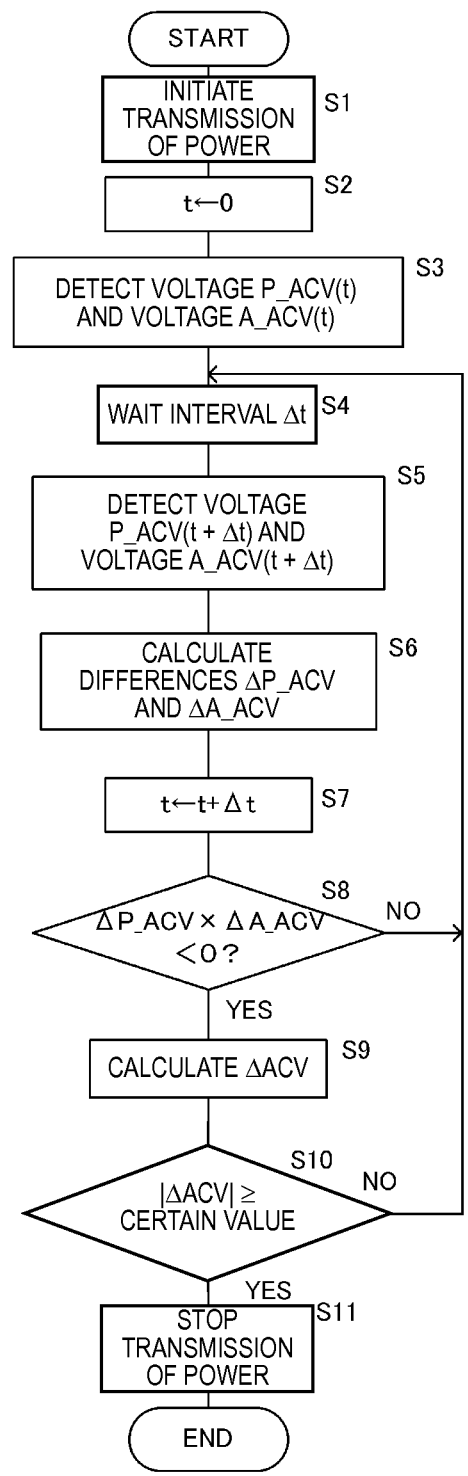
FIG. 14 is a flowchart of stop determination processing executed by a controller.

FIG. 14 is a flowchart of stop determination processing executed by the controller 12.

The controller 12 controls the driver 11 to initiate transmission of power (S1). Next, the controller 12 resets a timer (t=0) (S2). Next, a voltage P_ACV(t) and a voltage A_ACV(t) at a timing t are detected (S3). The controller 12 then waits a time $\Delta t$ (S4). After that, a voltage P_ACV(t+$\Delta t$) and a voltage A_ACV(t+$\Delta t$) are detected at a timing t+$\Delta t$ (S5).

The controller 12 calculates a difference $\Delta P\_ACV$ between the voltages P_ACV and a difference $\Delta A\_ACV$ between the voltages A_ACV detected at the timing t and the timing t+$\Delta t$ (S6). After that, the timing t+$\Delta t$ is set as a new timing t (S7). The controller 12 determines whether the result of multiplying the calculated ΔP_ACV and ΔA_ACV is less than 0, that is, has a negative value (S8). In the case where the result does not have a negative value (S8: NO), the controller 12 determines that the metal foreign object 50 is not interposed between the passive electrodes 14 and 24 or the active electrodes 13 and 23 or that a user is not touching the interposed metal foreign object 50 and returns to the processing of S4.

When the result of multiplying ΔP_ACV and ΔA_ACV has a negative value (S8: YES), the controller 12 calculates a difference ΔACV between ΔP_ACV and ΔA_ACV (S9). The controller 12 determines whether the absolute value |ΔACV| of the calculated difference ΔACV is equal to or greater than a predetermined value (for example 20 V) (S10). In the case where the absolute value |ΔACV| is equal to or greater than the predetermined value (S10: YES), the controller 12 determines that the metal foreign object 50 is interposed between the passive electrodes 14 and 24 and was touched by a user and stops the transmission of power (S11).

In the case where the calculated difference ΔACV is not equal to or greater than the certain value (S10: NO), the controller 12 determines that the metal foreign object 50 is either not interposed between the passive electrodes 14 and 24 or that a user is not touching the interposed metal foreign object 50 and returns to the processing of S4.

In the above description, ΔACV is calculated as the difference between ΔP_ACV and ΔA_ACV, but the present invention is not limited to this and it is sufficient that ΔACV be the change in voltage between the active electrode 13 and the passive electrode 14 in a time interval (Δt). That is, the difference between a difference ΔACV(t) between a voltage P_ACV(t) and a voltage A_ACV(t) detected at a timing t and a difference ΔACV(t+Δt) between a voltage P_ACV(t+Δt) and a voltage A_ACV(t+Δt) detected at a timing t+Δt may be calculated.

As described above, in this embodiment, changes in the voltage A_ACV of the active electrode 13 over time and changes in the voltage P_ACV of the passive electrode 14 over time are monitored and a determination is made whether the metal foreign object 50 has become interposed between the passive electrodes 14 and 24 or the active electrodes 13 and 23 and whether the metal foreign object 50 has been touched by a user as a function thereof. Therefore, a problem such as a user experiencing an electric shock upon touching the metal foreign object 50 can be prevented.

The invention claimed is:

1. A power transmission device that applies an alternating-current voltage to a first power-transmission-side electrode, which is adapted to oppose a first power-reception-side electrode of a power reception device with a gap therebetween when the power reception device is placed in an operative relationship with the power transmission device, and to a second power-transmission-side electrode, which opposes a second power-reception-side electrode of the power reception device with a gap therebetween when the power reception device is placed in the operative relationship with the power transmission device, and transmits power to the power reception device via electric field coupling, the power transmission device comprising:
   a first voltage monitoring unit that monitors a voltage of the first power-transmission-side electrode;
   a first change detection unit that detects a change in the voltage monitored by the first voltage monitoring unit at regular time intervals;
   a second voltage monitoring unit that monitors a voltage of the second power-transmission-side electrode;
   a second change detection unit that detects a change in the voltage monitored by the second voltage monitoring unit at the regular time intervals; and
   a power transmission stopping unit that stops transmission of power to the power reception device as a function of the changes detected by the first and second change detection units.

2. The power transmission device according to claim 1, wherein the power transmission stopping unit stops the transmission of power to the power reception device as a function of whether one out of the change detected by the first change detection unit and the change detected by the second change detection unit increases over time and the other decreases over time.

3. The power transmission device according to claim 1, wherein the power transmission stopping unit stops transmission of power to the power reception device as a function of whether an absolute value of a change in a difference between the voltage of the first power-transmission-side electrode and the voltage of the second power-transmission-side electrode exceeds a predetermined value.

4. A wireless power transmission system comprising:
   a power transmission device including a first and second power-transmission-side electrodes, and a DC to AC inversion circuit that converts a direct-current voltage into an alternating-current voltage and applies the voltage between the first and second power-transmission-side electrodes; and
   a power reception device including a first power-reception-side electrode that opposes the first power-transmission-side electrode with a gap therebetween, a second power-reception-side electrode that opposes the second power-transmission-side electrode with a gap therebetween, and a voltage supply circuit that supplies a voltage induced between the first power-reception-side electrode and the second power-reception-side electrode to a load;
   wherein the power transmission device includes:
   a first voltage monitoring unit that monitors a voltage of the first power-transmission-side electrode;
   a first change detection unit that detects a change in the voltage monitored by the first voltage monitoring unit at regular time intervals;
   a second voltage monitoring unit that monitors a voltage of the second power-transmission-side electrode;
   a second change detection unit that detects a change in the voltage monitored by the second voltage monitoring unit at regular time intervals; and
   a power transmission stopping unit that stops transmission of power to the power reception device as a function of the changes detected by the first and second change detection units.

5. A power transmission device, comprising:
   first and second electrodes for transmitting power to a power receiving device placed in an operational relationship with the first and second electrodes;
   an AC power generator for generating an AC voltage and applying it to the first and second electrodes;
   a controller for controlling the AC voltage applied to the first and second electrodes, the controller:
      monitoring the voltage on the first electrode and determining how that voltage changes at the beginning and end of each of a plurality of predetermined time intervals;

monitoring the voltage on the second electrode and determining how that voltage changes at the beginning and end of each of the plurality of predetermined time intervals; and determining when to cut off the application of the AC voltage to the first and second electrodes as a function of the manner in which the voltage on the first and second electrodes changes at the beginning and end of at least one of the predetermined time intervals.

6. The power transmission device of claim 5, wherein the AC power generator comprising a DC to AC inverter circuit.

7. The power transmission device of claim 6, wherein the AC power generator further comprises a step-up transformer coupled between an output of the DC to AC inverter circuit and the first and second electrodes.

8. The power transmission device of claim 6, wherein the operation of the DC to AC inverter circuit is controlled by the controller.

9. The power transmission device of claim 5, wherein the controller is a microprocessor programmed to:

start the application of power to the first and second; and terminate the application of power to the first and second electrodes when the voltages on the first and second electrode indicate that a metal object has been placed between the first electrode and the third electrode and/or between the second electrode and the fourth electrode and a user has touched the metal object.

10. The power transmission device of claim 9, wherein the microprocessor is programmed to determine whether a metal object has been placed between the first electrode and the third electrode and/or between the second electrode and the fourth electrode and a user has touched the metal object by:

determining the change in voltage on the first electrode at the beginning and end of one of the predetermined time intervals;

determining the change in voltage on the second electrode at the beginning and end of the one of the predetermined time intervals;

determining if the change in voltage of one of the first and second electrodes at the beginning and end of the one of the predetermined time intervals is positive and the other is negative; and determining if the absolute value of difference between the change in voltages at the first and second electrodes at the beginning and end of the one of the predetermined time intervals is greater than a predetermined value.

11. The power transmission device of claim 5, wherein the power receiving device is placed in the operative position when first and second electrodes of the power receiving device are opposed to the first and second electrodes of the power transmission device, respectively.

12. The power transmission device of claim 5, wherein the controller is a microprocessor programmed to:

start the application of power to the first and second electrodes; and terminate the application of power to the first and second electrodes when:

the change in voltage on one of the first and second electrodes at the beginning and end of a first of one of the predetermined time intervals increases while the change in voltage on the other of the first and second electrodes at the beginning and end of the one of the predetermined time intervals decreases; and the absolute value of difference between the change in voltages at the first and second electrodes at the beginning and end of the one of the predetermined time intervals is greater than a predetermined value.

13. The power transmission device of claim 5, wherein each of the predetermined time intervals is of the same length.

14. The power transmission device of claim 13, wherein each predetermined time interval begins when the proceeding predetermined time interval ends.

* * * * *